United States Patent [19]
McIntosh

[11] 3,927,401
[45] Dec. 16, 1975

[54] METHOD AND APPARATUS FOR CODING AND DECODING DIGITAL DATA

[75] Inventor: Duane E. McIntosh, Santa Ynez, Calif.

[73] Assignee: General Motors Corporation, Detroit, Mich.

[22] Filed: Oct. 10, 1973

[21] Appl. No.: 405,070

Related U.S. Application Data

[63] Continuation-in-part of Ser. No. 309,355, Nov. 24, 1972, abandoned.

[52] U.S. Cl. ........................ 340/347 DD; 325/38 A
[51] Int. Cl.[2] ........................ H04L 3/00
[58] Field of Search .............. 340/347 DD, 174.1 G; 325/38 A

[56] References Cited

UNITED STATES PATENTS 2,700,696 1/1955 Barker ..................... 340/347 DD X
3,226,685 12/1965 Potter et al. ................ 340/174.1 G
3,233,236 2/1966 Katzenstein et al. .......... 340/347 DD
3,374,475 3/1968 Gabor ......................... 340/174.1 G
3,573,766 4/1971 Perkins ....................... 340/347 DD
3,623,041 11/1971 MacDougall ................. 340/174.1 G
3,629,823 12/1971 Czernikowski ........... 340/347 DD X

*Primary Examiner*—Malcolm A. Morrison
*Assistant Examiner*—Vincent J. Sunderdick
*Attorney, Agent, or Firm*—Albert F. Duke

[57] ABSTRACT

A method of coding binary data is disclosed in which a two level binary data signal is converted to a three level coded data signal wherein two of the four possible two bit configurations are represented by predefined level changes between the three levels. The intervening bit or bits of data are represented by maintaining the level resulting from coding the previous pair of bits. Apparatus for carrying out the method is disclosed as well as apparatus for decoding the coded signal.

17 Claims, 8 Drawing Figures

METHOD AND APPARATUS FOR CODING AND DECODING DIGITAL DATA

This is a Continuation-in-Part of my copending application Ser. No. 309,355, filed Nov. 24, 1972, now abandoned and assigned to the assignee of the present invention.

BACKGROUND OF THE INVENTION

This invention relates to data compression techniques and more particularly to a unique method and apparatus for coding and decoding binary data.

When binary information is transmitted over a long distance analog communication link, such as the available telephone lines, the transmission is accomplished by having the bit stream modulate a carrier which is suitable for transmission by the lines. The modulation may be accomplished by varying the amplitude, the frequency, or the phase of the carrier in accordance with the digital data to be conveyed. Multilevel coding schemes have been proposed for use in high speed data transmission systems or where bandwidth efficiency is important. In a multilevel coding scheme the modulating signal assumes any one of several possible levels rather than one of two levels as in non-return-to-zero (NRZ) coding. In a four level modulation scheme each level contains two bits of information whereas in NRZ each level contains one bit of information. This allows, in the ideal case, a more efficient utilization of the available bandwidth. The limiting factor in the number of levels used in the modulating signal is that noise susceptibility of the system increases with the number of levels used. For example, if a carrier is modulated by a four level signal, each level corresponding to one of the four possible two bit configurations i.e. 00, 11, 01, or 10, the available amplitude range of the modulating signal necessary to discriminate between levels is divided by 4. Any noise injected into the communications channel of a peak-to-peak amplitude greater than the difference between levels of the modulating signal would prevent discrimination between the various levels.

SUMMARY OF THE INVENTION

In accordance with the present invention an improved method of coding binary information is proposed which achieves a significant improvement in signal-to-noise ratio over prior art four level coding techniques while reducing the analog circuitry normally required in four level coding. In accordance with the present invention two level binary input data is converted to a three level output signal wherein the changes in level of the output signal represent certain pairs of the four possible two bit configurations. The coding of the selected two bit configurations is achieved by changing the level of the coded signal from its existing level to a predefined one of the other two levels depending on its existing level. No level change occurs for the bit pattern occurring between the selected two bit configurations. The criteria for the selection of the two bit configurations is that the second bits of each pair are complementary. In other words, the level changes in the output signal may be based on the coding of the following pairs of two bit configurations 11, 00; 10, 01; 11, 10; and 00, 01.

Accordingly, it is an object of the present invention to provide an improved method and apparatus for coding digital information.

It is another object of the present invention to provide greater signal-to-noise ratio in a band limited data transmission system.

Other objects and advantages of the present invention may be had from the following detailed description which should be read in conjunction with the drawings in which:

DETAILED DESCRIPTION OF THE INVENTION

Figure 1:
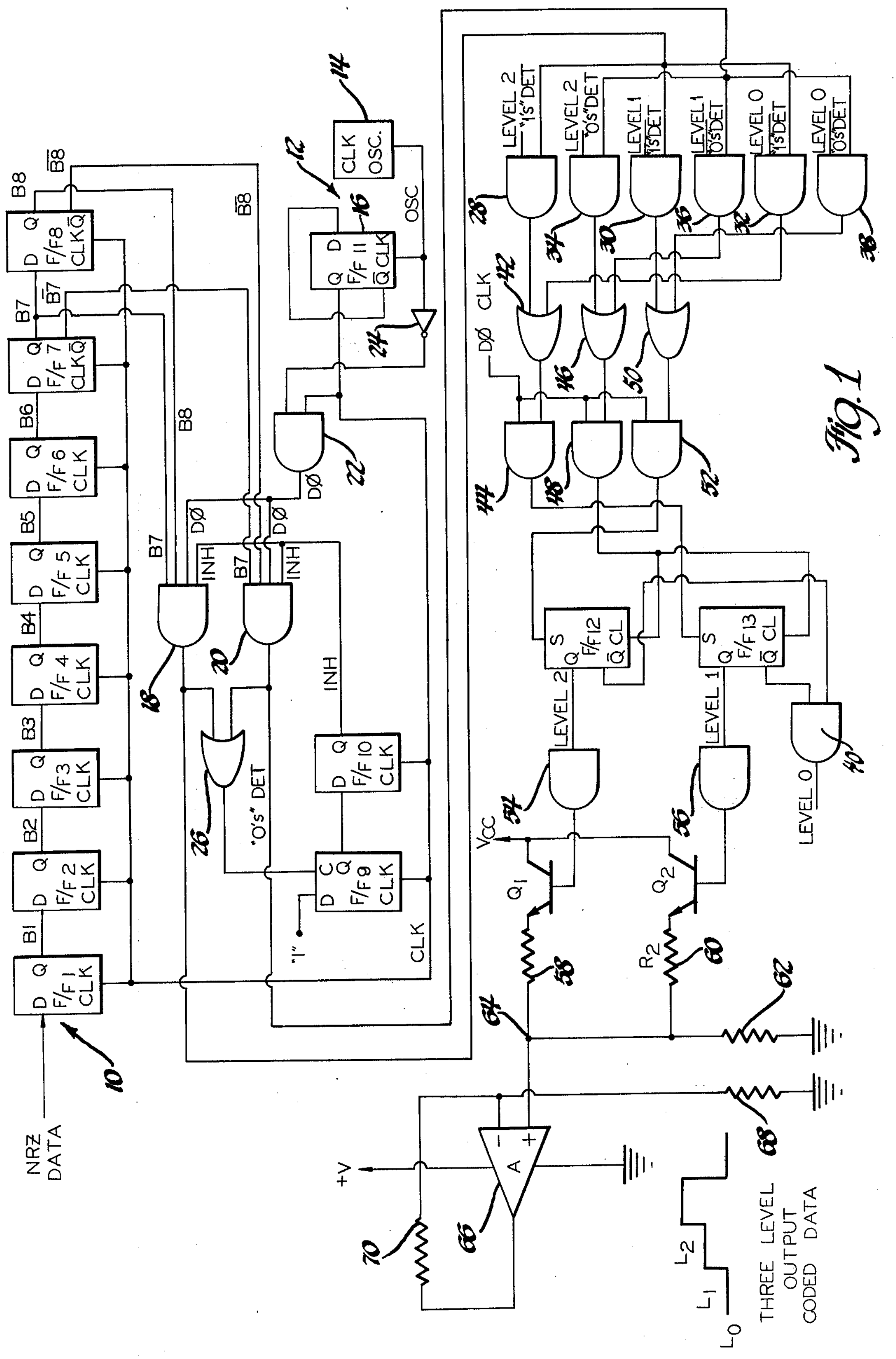
FIG. 1 is a logic diagram of the three amplitude encoder of the present invention.
Figure 2:
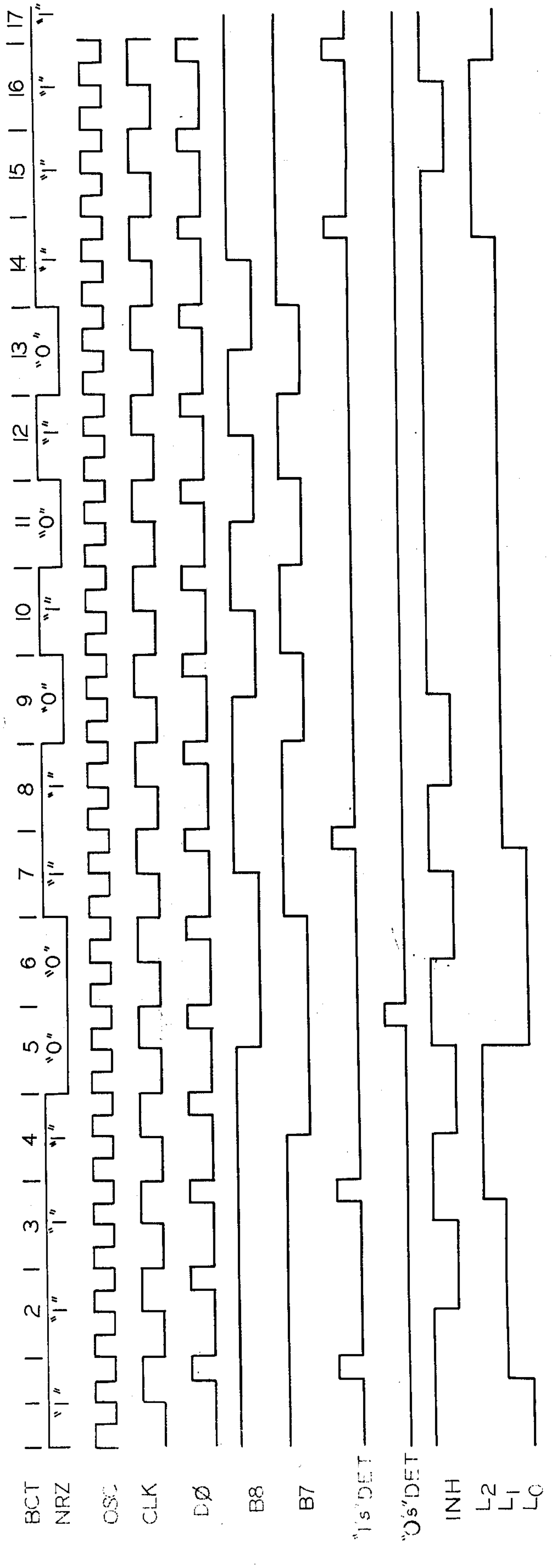
FIG. 2 shows the waveforms present at various locations in the logic diagram of FIG. 1.

Referring now to the drawings and initially to FIGS. 1 and 2, a first embodiment of the encoder of the present invention as shown. In this embodiment each bit of each of the two pairs of bits selected to produce level changes in the coded signal are complementary. This limits the pairs of two bit configurations to 00, 11 and 01, 10. In particular, the logic of FIG. 1 is constructed to respond to the two bit configurations 00, 11. The input NRZ data is stored in a data storage register generally designated 10 including flip-flops FF1 through FF8. The NRZ data is shifted into the register 10 by a reference clock generally designated 12 which is synchronized with the incoming NRZ data. The clock 12 comprises a twice bit rate frequency oscillator 14 and a D type flip-flop 16 which is clocked from the output of the oscillator 14 and has its D and $\overline{Q}$ outputs interconnected. The output of the clock 12 is designated CLK and is applied to the clock input of the register 10. The Q outputs of the flip-flops FF7 and FF8 provide inputs to an AND gate 18 while the $\overline{Q}$ outputs of the flip-flops FF7 and FF8 provide inputs to an AND gate 20. A sampling pulse train designated D$\phi$ is applied to both gates 18 and 20 from the output of an AND gate 22. The inputs to the gate 22 are CLK and the output of the oscillator 14 through an inverter 24. The rising edge of the D$\phi$ pulse train occurs after a bit of NRZ data is shifted into the register 10 to permit the register outputs to obtain a quiescent state. When the two bit configuration 11 is stored in FF7 and FF8 the output of the gate 18 is switched high on the leading edge of the D$\phi$ pulse. When the two bit configuration 00 is stored in FF7 and FF8 the output of the gate 20 is switched high on the leading edge of a D$\phi$ pulse. The output of the gates 18 and 20 are respectively designated 1's PAIR DETECT and 0's PAIR DETECT and provide inputs to an OR gate 26. The output of the OR gate 26 is connected with the clear input of a flip-flop FF9 which is clocked from the CLK signal. The D input to the flip-flop FF9 is tied to logic 1 and its Q output is connected with the D input of a flip-flop FF10 which is clocked from the CLK signal. The Q output of the flip-flop FF10 provides a fourth input to the AND gates 18 and 20 designated INH. The output of the flip-flop FF10 goes low to inhibit the gates 18 and 20 for one bit cell time following detection of a pair of like bits by either of the gates 18 or 20. By inhibiting the gates 18 and 20 for one bit cell time only discrete pairs of like bits are detected. In other words, only the first pair of adjacent like bits in the three bit configuration 111 or 000 is detected.

The output of gate 18 is applied as one input to AND gates 28, 30, and 32 while the output of the gate 20 is applied as one input to AND gates 34, 36, and 38. The other input to the gates 28 and 34 is from the Q output of a flip-flop FF12 designated LEVEL 2. The other input to the gates 30 and 36 is from the Q output of a flip-flop FF13 designated LEVEL 1. The $\overline{Q}$ outputs of the flip-flops FF12 and FF13 provide inputs to an AND gate 40 the output of which is designated LEVEL 0 and provides a second input to the gates 32 and 38. The outputs of the gates 28 and 32 are OR'ed in an OR gate 42 the output of which provides one input to an AND gate 44. The output of the gates 34 and 36 are OR'ed in an OR gate 46 which provides one input to an AND gate 48. The output of the gates 30 and 38 are OR'ed in OR gate 50, the output of which provides one input to AND gate 52. The other input to the gates 44, 48, and 52 is the D$\phi$ pulse train. The flip-flop FF12 is set from the output of the gate 52 so that its Q output goes high. The flip-flop FF13 is set from the output of the gate 44 so that its Q output goes high. The flip-flops FF12 and FF13 are cleared from the output of the gate 48 so that their $\overline{Q}$ outputs go high causing the output of the gate 40 to go high. The Q output of the flip-flop FF12 is fed through a buffer gate 54 to provide the necessary current drive to the base of a transistor Q1. Similarly, the Q output of the flip-flop FF13 is fed through a buffer gate 56 and applied to the base of a transistor Q2. The collector electrodes of the transistors Q1 and Q2 are connected to a reference voltage $V_{cc}$. The emitters of the transistors Q1 and Q2 are applied to a voltage dividing network comprising resistors 58, 60, and 62. The value of the resistors 58 and 62 are the same while the resistor 60 is twice the value of the resistors 58 or 62. The junction 64 of the voltage dividing resistors is applied to the non-inverting input of an operational amplifier 66 connected between a positive reference voltage V and ground. The inverting input of the operational amplifier 66 is connected to ground through a resistor 68 and is connected to the output of the operational amplifier 66 through resistor 70.

It is assumed for purposes of discussion that the flip-flops FF12 and FF13 are initially cleared by the usual POWER ON initialization circuit (not shown) so that LEVEL 0 is established. Initially therefore, the output of the operational amplifier 66 is at LEVEL 0 since both transistors Q1 and Q2 are nonconductive. Accordingly, if the output of the gate 18 goes high indicative of the storage of a pair of 1's in the flip-flops FF7 and FF8, the gate 44 is enabled through the gate 42 so that the D$\phi$ pulse train sets the flip-flops FF13 driving its Q output high thereby energizing the transistor Q2 and establishing the LEVEL 1 output of the operational amplifier 66. If on the other hand, the output of the gate 20 goes high indicating that a pair of 0's are stored in the flip-flops FF7 and FF8 then the gate 52 is enabled through the gate 50 so that the D$\phi$ pulse train sets the flip-flop FF12 causing its Q output to go high, energizing the transistor Q2 and establishing the LEVEL 2 output of the operational amplifier 66. If either of the two bit configurations 01 or 10 are stored in the flip-flops FF7 or FF8 no change occurs in the output level of the operational amplifier 66.

If the output of the operational amplifier 66 is at LEVEL 1 at the time a pair of 1's is detected, the flip-flop FF12 is set so as to establish LEVEL 2. On the other hand, if a pair of 0's is detected while the output of the operational amplifier 66 is at LEVEL 1 the flip-flops FF12 and FF13 are cleared to establish LEVEL 0.

If the output of the operational amplifier 66 is at LEVEL 2 when a pair of 1's is detected the flip-flop FF13 is set to cause the operational amplifier 66 to establish LEVEL 1. On the other hand if a pair of 0's is detected while the output of the operational amplifier 66 is at LEVEL 2 the flip-flops FF12 and FF13 are cleared to establish LEVEL 0.

The aforementioned level changes in the output of the operational amplifier 66 may be summarized as follows: Upon detection of a pair of 1's the output of the operational amplifier 66 is switched from its present level to LEVEL 1 unless the present level is already LEVEL 1 in which event it is switched to LEVEL 2. Upon detection of a pair of 0's the output of the operational amplifier 66 is switched from its present level to LEVEL 0 unless its present level is already LEVEL 0 in which event it is switched to LEVEL 2.

Figure 3:
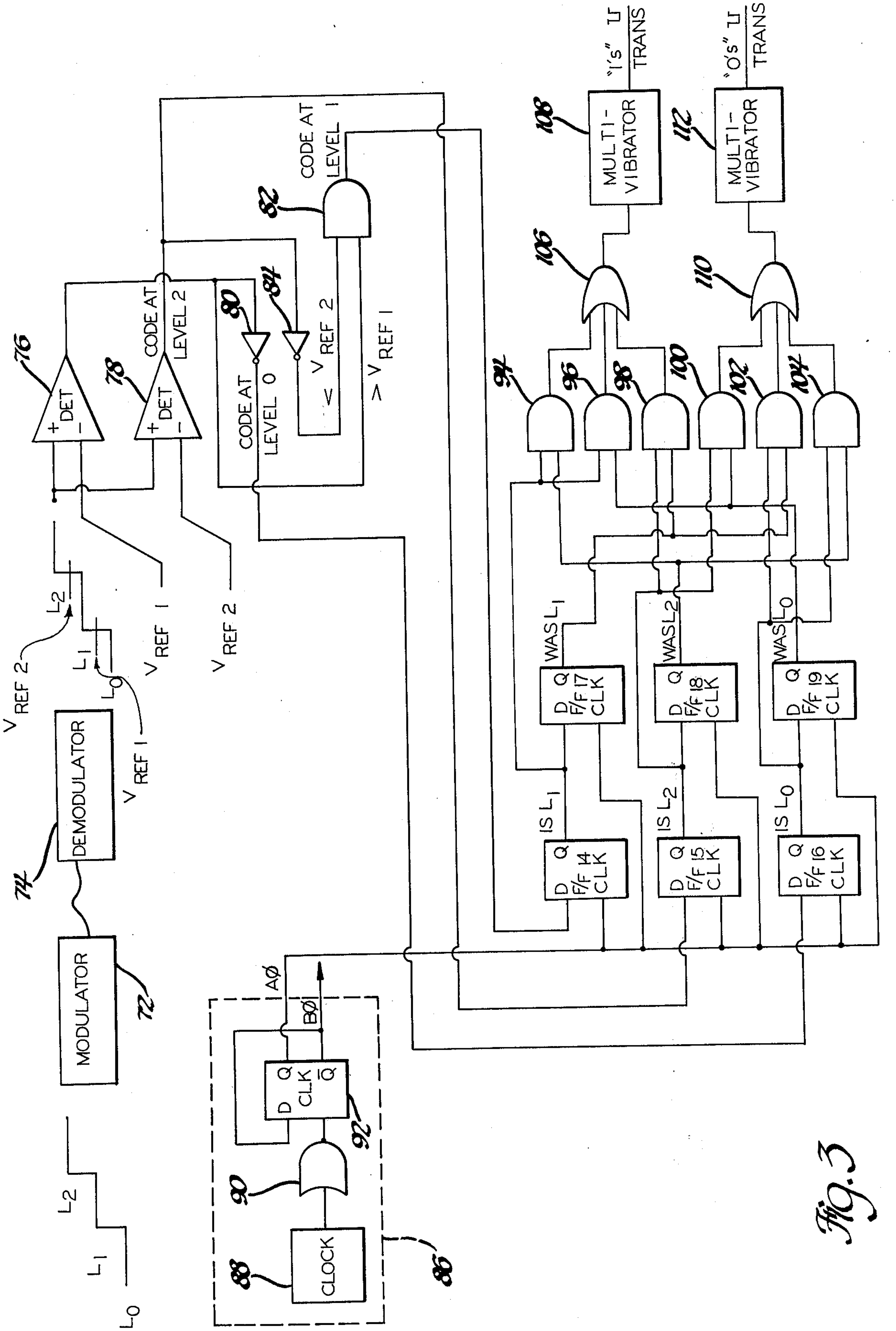
FIGS. 3 and 3*a* are logic diagrams decoding apparatus of the present invention.
Figure 4:
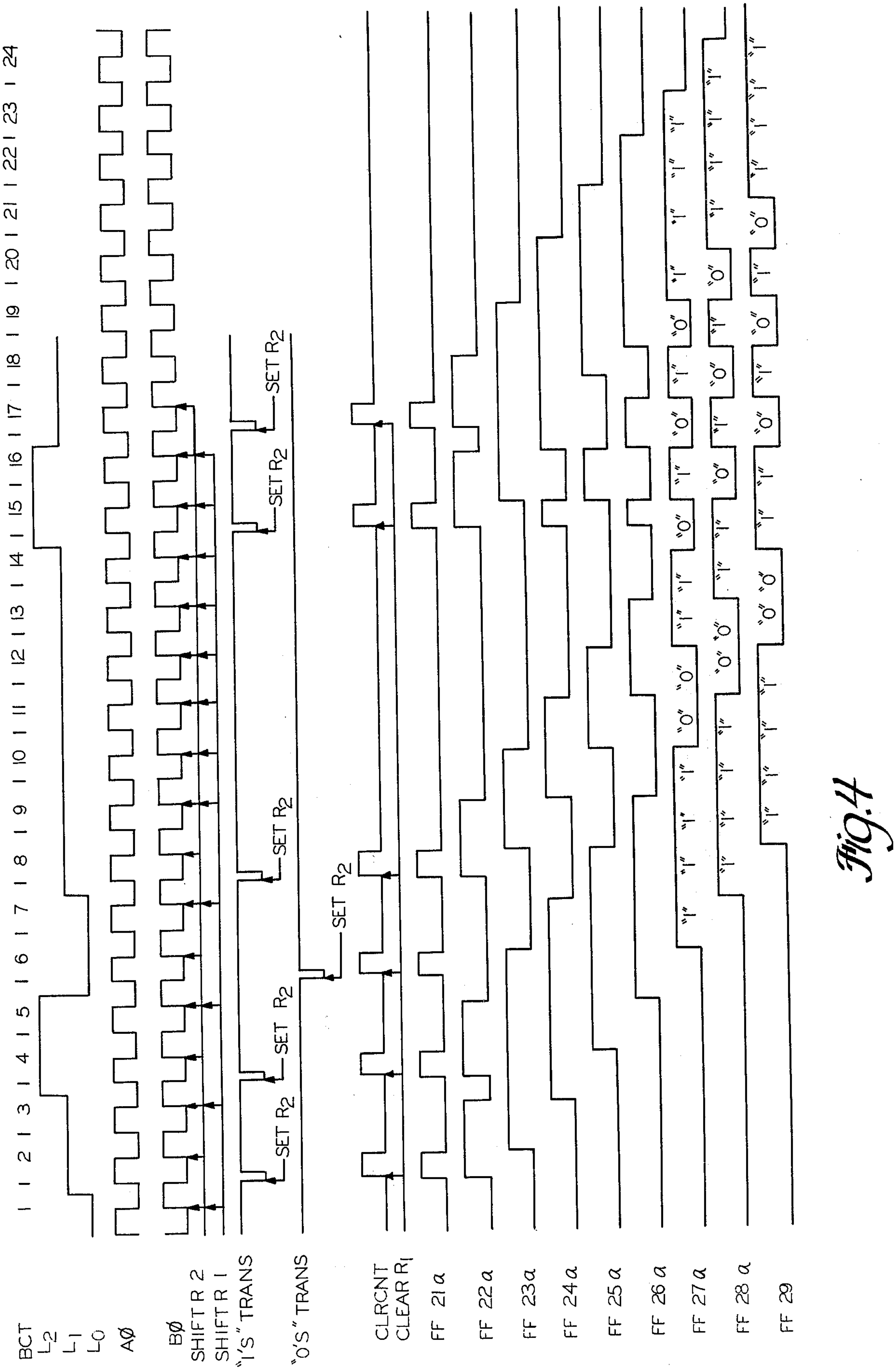
FIG. 4 shows the waveforms present at various locations in the logic diagram of FIG. 3.

Referring now to FIGS. 3 and 4, the three level coded signal generated by the encoder of FIG. 1 is used to modulate a carrier in a modulator generally designated 72. The modulated carrier signal is transmitted over a transmission link to a demodulator generally designated 74 where the three level coded signal is obtained and applied to the non-inverting inputs of level detectors 76 and 78. The inverting input of the level detector 76 is connected with a reference voltage $V_{REF1}$ between LEVEL 0 and LEVEL 1 while the non-inverting input of the level detector 78 is connected to a reference voltage $V_{REF2}$ which corresponds to a voltage level between LEVEL 1 and LEVEL 2. The output of the detector 76 is fed through an inverter 80 to provide the output designated CODE AT LEVEL 0. The output of the detector 76 will be low and the output of the inverter 80 will be high as long as the level of the coded signal is below the $V_{REF1}$. The output of the detector 78 is designated CODE AT LEVEL 2 and will be high whenever the voltage level of the coded signal is greater than $V_{REF2}$. An AND gate 82 has one input connected to the output of the detector 78 through an inverter 84 and the other input connected to the output of the detector 76. Accordingly, if the level of the coded signal is less than $V_{REF2}$ and greater than $V_{REF1}$ the output of the gate 82 will be high and is designated CODE AT LEVEL 1.

The output of the gate 82 is applied to the D input of a flip-flop FF14. The output of the detector 78 is connected with the D input of a flip-flop FF15. The output of the detector 76 is connected with the D input of a flip-flop FF16. The Q output of the flip-flops FF14, FF15, and FF16 are connected with the D inputs of respective flip-flops FF17, FF18, and FF19. The flip-flop FF14 through FF19 are clocked from a clock generator generally designated 86 which develops first and second clock pulse trains designated A$\phi$ and B$\phi$. The clock generator 86 comprises a clock oscillator 88 operating at a frequency of twice bit rate frequency and synchronized with the incoming coded data. The output of the clock 88 is applied through a NOR gate 90 to the clock input of a D type flip-flop 92 having its D and $\overline{Q}$ outputs interconnected and producing the A$\phi$ and B$\phi$ clock pulse trains at its Q and $\overline{Q}$ outputs respectively. The Q output of the flip-flops FF14, FF15, and FF16 are driven high to indicate the present level of the coded signal. The Q outputs of the flip-flops FF17, FF18, and FF19 are driven high to indicate the previous level of the coded signal. The outputs of the flip-flops FF14 through FF19 are connected with AND gates 94 through 104 as indicated. The output of the gates 94, 96, and 98 are OR'ed through an OR gate 106 and applied to a positive edge triggered multivibrator 108 which produces a negative going pulse if the present level of the coded signal is at LEVEL 1 and was previously at LEVEL 2, or is at LEVEL 1 and previously was at LEVEL 0, or is at LEVEL 2 and was previously at LEVEL 1. Accordingly, the output of the multivibrator is normally high but goes low for an interval of time whenever the aforementioned logic determines that a level transition in the coded signal corresponds to the coding of the two bit configuration 11. The output of the gates 100, 102, and 104 are OR'ed in an OR gate 110 which is applied to the input of a positive edge triggered multivibrator 112 which produces a negative going pulse whenever the present level of the coded signal is LEVEL 2 and was previously LEVEL 0 or is LEVEL 0 and was previously LEVEL 1, or is LEVEL 0 and was previously LEVEL 2. Accordingly, the output of the multivibrator 112 is normally high but goes low for an interval of time whenever the aforementioned logic determines that a level transition in the coded signal corresponds to the coding of the two bit configuration 00.

The negative going pulses in the outputs of the multivibrators 108 and 112 are OR'ed in an AND gate 114 and applied to the D input of a flip-flop 116 which is clocked from the B$\phi$ clock pulse train. The output of the gate 114 is inverted by NOR gate 118 and applied to the clear input of the flip-flop 116. The Q output of the flip-flop 116 is inverted by NOR gate 120 to provide an output pulse train designated CLRCNT which is applied to an elapsed bit time counter R1 comprising flip-flops FF21 through FF28. The CLRCNT signal is applied to the set input of the flip-flop FF21 and to the clear input of the flip-flops FF22 through FF28. The flip-flops FF22 through FF28 are clocked from the B$\phi$ clock pulse train. The CLRCNT signal is normally low since the input to the D type flip-flop 116 is normally high. However, upon decoding of a pair of 1's or a pair of 0's the flip-flop 116 is cleared to drive the CLRCNT signal high to set the flip-flop FF21 and clear the flip-flops FF22 through FF28. The CLRCNT pulse train is driven low when the rising edge of B$\phi$ clocks the flip-flop 116. However, due to the delay associated with the flip-flop 116 and the gate 120 the leading edge of the CLRCNT signal lags the leading edge of the 1's TRANS or 0's TRANS pulses and the falling edge of the CLRCNT signal lags the leading edge of the B$\phi$ pulse train. Thus, the CLRCNT signal is high at the time the B$\phi$ pulse train is applied to the clock input to the flip-flops FF22 through FF28 and the flip-flops FF22 through FF28 are not clocked until the second B$\phi$ clock pulse following a 1's TRANS or 0's TRANS pulse. The B$\phi$ pulse train also clocks a reconstruction register R2 comprising D type filp-flops FF21*a* through FF29. The flip-flops FF21*a* through FF28*a* are set by NOR gates 122 through 136. The gates 122 through 136 have one input connected respectively with the $\overline{Q}$ output of the flip-flops FF21 through FF28. The other input to the gates 122, 124, 128, and 132 and 136 are from the output of the multivibrator 108. The other input to the gates 126, 130, and 134 are the output of the multivibrator 112.

The operation of the decoder will be described with reference to the waveforms shown in FIG. 4 wherein the previously coded three level signal is reproduced.

At the beginning of bit cell time (BCT) 1 the flip-flop FF16 is clocked by A$\phi$ causing its Q output to go high indicative of the fact that the coded signal is at LEVEL 0. At the beginning of BCT2 the flip-flop FF19 is clocked by the leading edge of A$\phi$ indicative of the fact that the previous level of the coded signal was LEVEL 0 while the flip-flop FF14 is clocked so that its Q output goes high indicative of the fact that the present level of the coded signal is LEVEL 1. Accordingly, the multivibrator 108 is triggered to produce a 1's TRANS pulse. The register R1 is initially placed in a condition where its $\overline{Q}$ outputs are all logic 0. This may be accomplished by the usual POWER ON initialization circuit (not shown). Accordingly, when the 1's TRANS pulse occurs at the beginning of BCT2 the inputs to the gates 122 and 124 are both low so that the flip-flops FF21*a* and FF22*a* are set high. The leading edge of the 1's TRANS pulse clears the flip-flop 116 and after a short delay the output of the gate 120 goes high clearing FF22 through FF28 and setting FF21. The logic 1 outputs of FF21*a* and FF22*a* are shifted into FF22*a* and and FF23*a* respectively, by the leading edge of the B$\phi$ clock pulse occurring at the middle of BCT2. The CLRCNT pulse is still high at the leading edge of B$\phi$ so that the data in flip-flops FF22 through FF28 is not shifted for the first B$\phi$ pulse following a 1's TRANS or 0's TRANS pulse. At the beginning of BCT3 the registers R1 and R2 are shifted by the leading edge of the B$\phi$ clock pulse. At the beginning of BCT4 the level change from the previous LEVEL 1 to the present LEVEL 2 produces a 1's TRANS pulse setting the flip-flops FF21*a* and FF22*a*. At the beginning of BCT6 a level change from LEVEL 2 to LEVEL 0 produces a 0's TRANS pulse which has no effect on the register R2 but does clear the register R1. At the beginning of BCT8, the level change from LEVEL 0 to LEVEL 1 produces a 1's TRANS pulse which sets the flip-flops FF21*a* and FF22*a*. At the beginning of BCT15 it will be noted that the register R1 has been shifted six times. Accordingly, the $\overline{Q}$ outputs of the flip-flops FF22 through FF27 are all logic 0's. Thus, the production of the 1's TRANS pulse at the beginning of BCT15 causes not only the setting of flip-flops FF21*a* and FF22*a* but also the setting of flip-flops FF24*a* and FF26*a* to reconstruct the bit pattern 01010 between the two bit configurations 11 and 11 on the opposite sides thereof. At the beginning of BCT17 a 1's TRANS pulse is produced indicative of the fact that the present level of the coded signal is at LEVEL 1 and the previous level was LEVEL 2 thereby setting the flip-flops FF21 and FF22 and to reconstruct the last two bits in the NRZ bit stream. The NRZ bit stream exits at the Q output of the flip-flop FF29*a* and as shown in the waveforms is the reconstructed NRZ data previously coded.

Figures 5, 6:
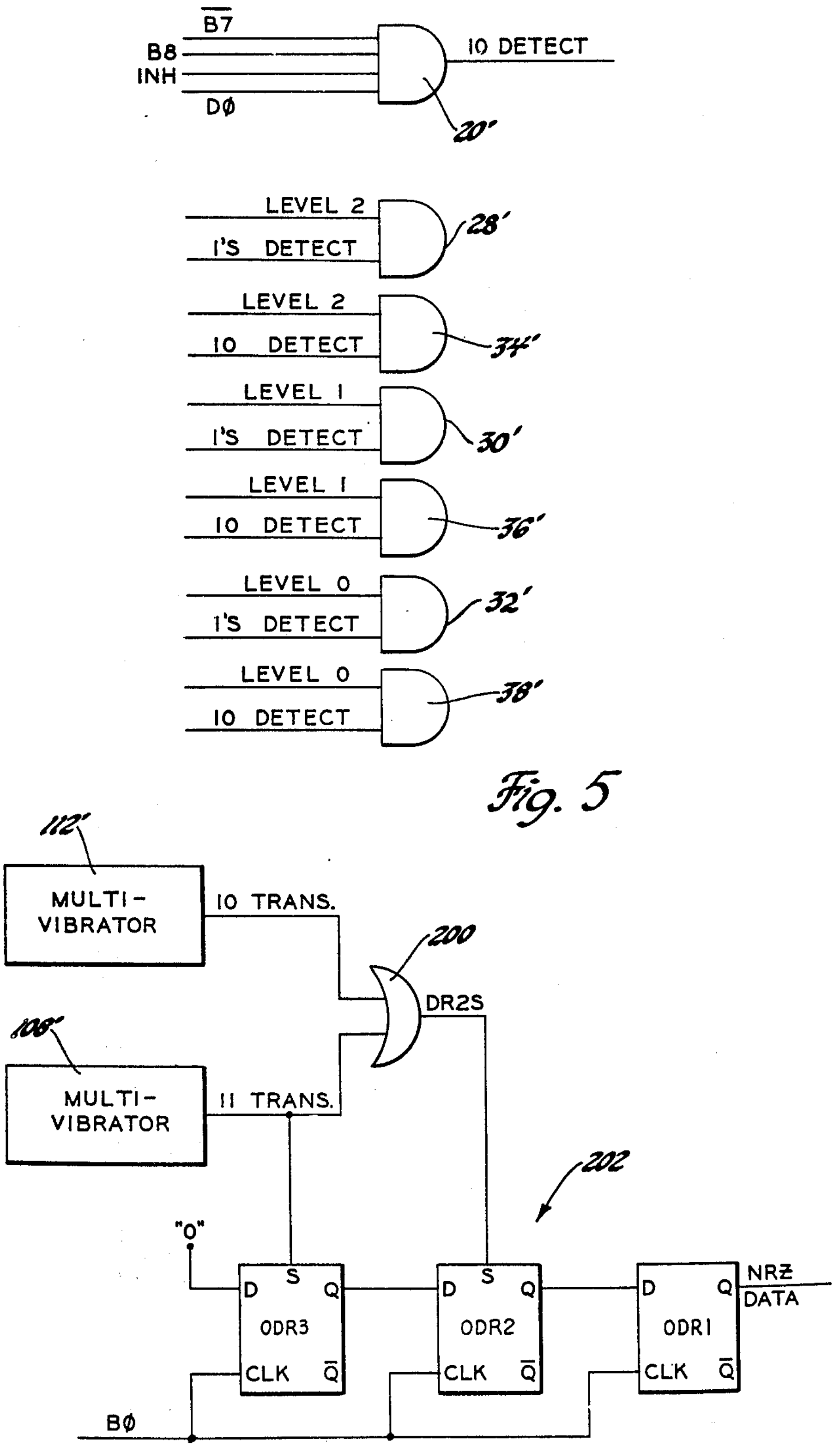
FIG. 5 shows a modification of the encoder logic of FIG. 1 for implementing a second embodiment of the invention.
FIG. 6 shows decoder logic replacing the FIG. 3*a* logic in connection with a second embodiment of the invention.

FIG. 5 shows the required modifications to FIG. 1 for encoding in accordance with a second embodiment of the invention. In this embodiment of the invention the gate 20 of FIG. 1 is replaced by the gate 20' of FIG. 5.

Figure 3A:
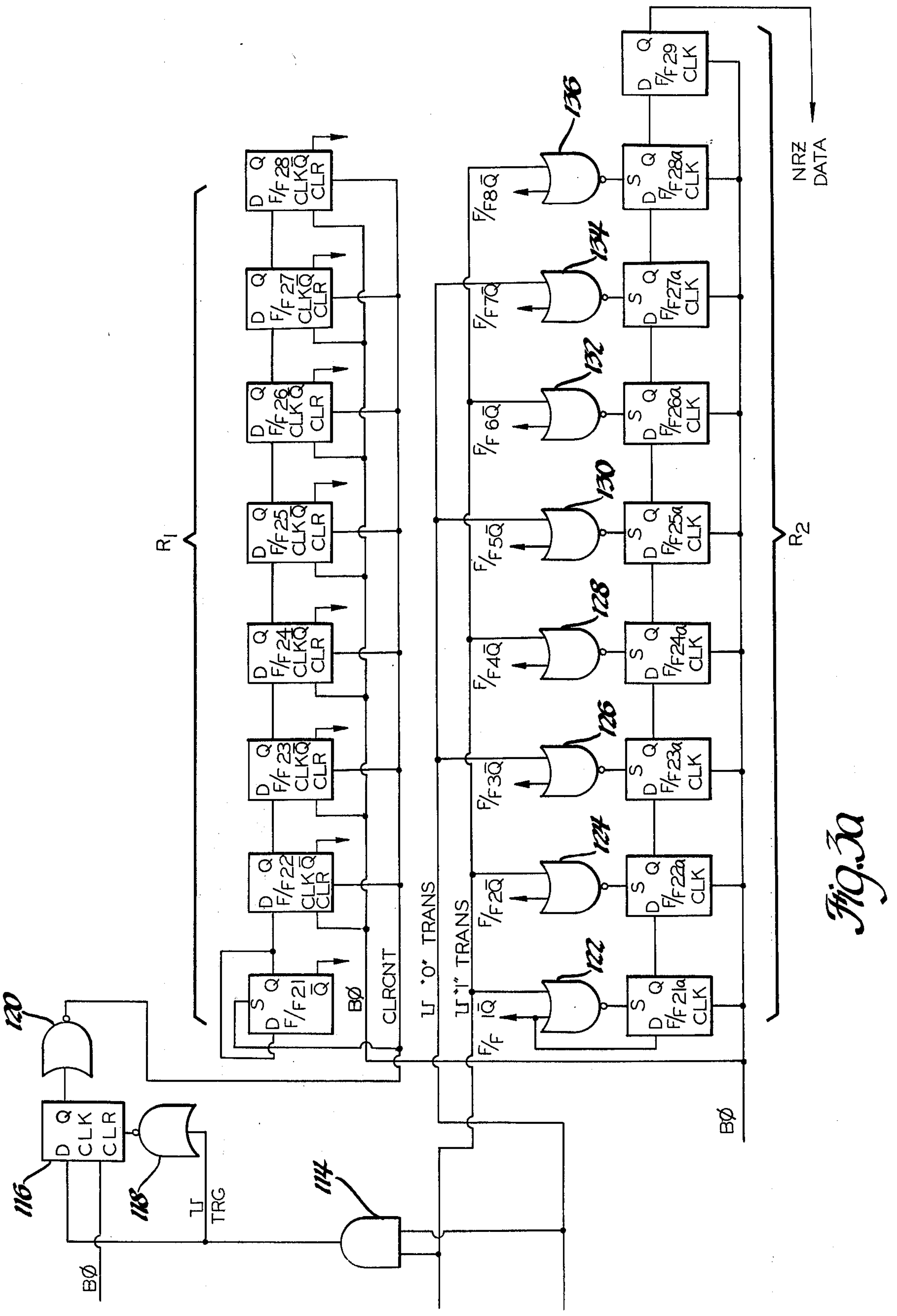

The inputs to the gate 20' are $\overline{B7}$, B8, INH, and Dφ so that its output is driven high when the two bit configuration 10 is present in the flip-flops FF8 and FF7 respectively rather than 00 as in FIG. 1. The output of the gate 20' is designated 10 DET. The output of the gate 20' is applied as one input to the gates 34', 36', and 38' in place of the 0's DET input to the gates 34, 36, and 38 of FIG. 1. The remaining logic in FIG. 1 otherwise is retained in the second embodiment. The decoder of the second embodiment retains the logic of FIG. 3 but the output of the multivibrator 112' corresponding to the multivibrator 112 of FIG. 3 represents the detection of level changes utilized in encoding the two bit configuration 10 and is designated 10 TRANS. In the second embodiment the logic shown in FIG. 3*a* is replaced by greatly simplified logic including an OR gate 200 which has inputs connected with the output of multivibrators 108' and 112'. The output of the gate 200 is designated DR2s. An output data register 202 comprises three flip-flops designated ODR3, ODR2, and ODR1 which are clocked from Bφ. A logic 0 is applied to the D input of ODR3 and the NRZ data appears at the Q output of ODR1. ODR3 is set from the output of multivibrator 108' while the flip-flop ODR2 is set from the output of gate 200. The multivibrators 108' and 112' produce positive going pulses as opposed to the negative going pulses of the multivibrators 108 and 112 of FIG. 3.

Figure 7:
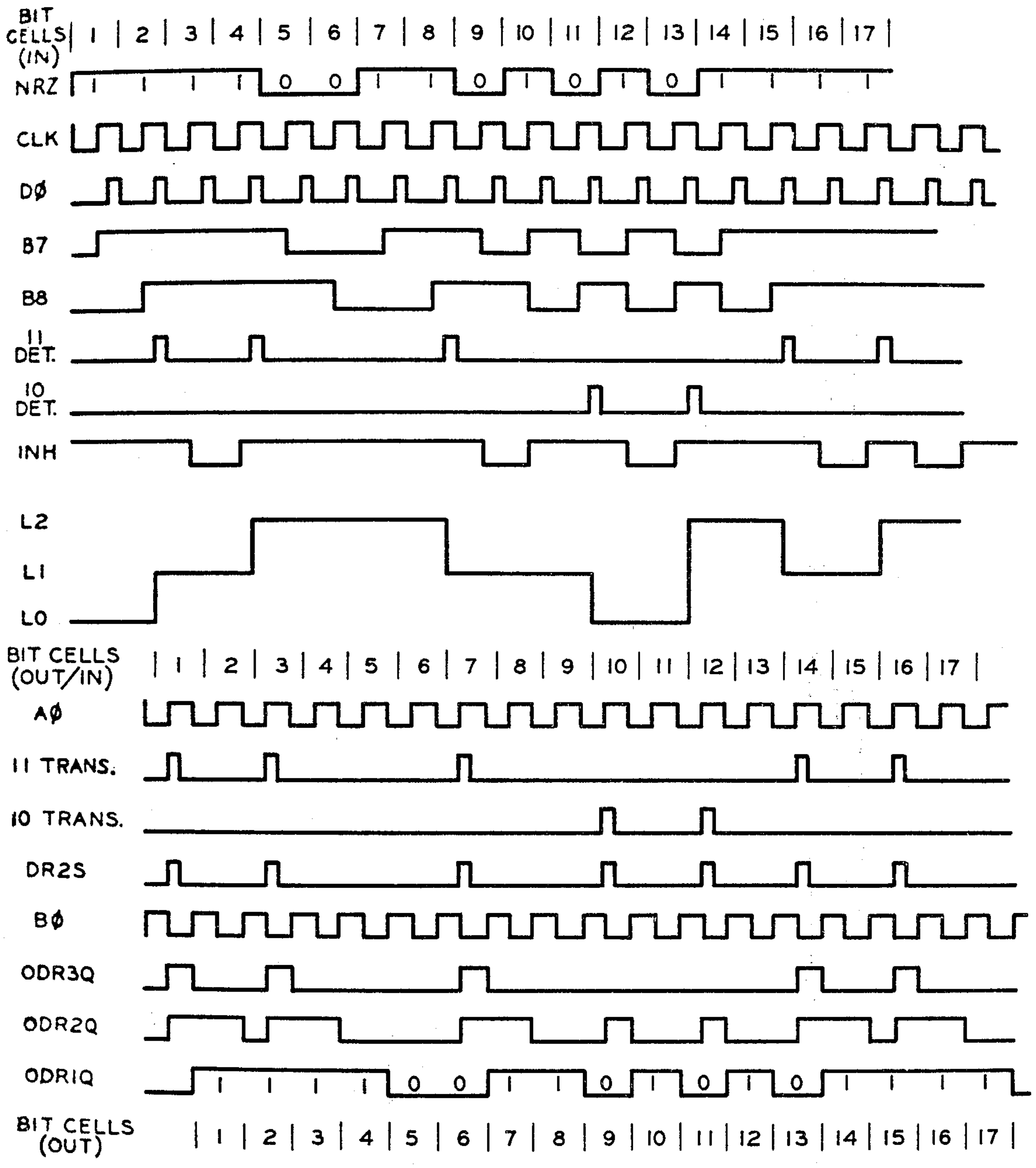
FIG. 7 shows somewhat idealized waveforms present in the operation of the second embodiment of the invention.

Referring now to FIG. 7, somewhat idealized waveforms for the encoder and decoder of the second embodiment of the invention is shown in connection with the encoding and decoding of the same seventeen bits of data utilized in connection with the first embodiment of the invention. This data produces 11 DET. pulses aligned with the Dφ pulses occurring in bit cell 2 of the input data (BCI2) and in BCI4, BCI8, BCI15, and BCI17. 10 DET. pulses are produced in alignment with the Dφ pulses occurring in BCI11 and BCI13. Accordingly, the coded output waveform which is illustrated as initially residing at LEVEL 0 is switched to LEVEL 1 at the beginning of bit cell 1 of the coded output data (BCO1). Since the coded output signal is at LEVEL 1 at the beginning of BCO3 when a 11 DET. pulse occurs the signal is switched to LEVEL 2 and then back to LEVEL 1 at the beginning of BCO7. At the beginning of BCO10 the signal is switched to LEVEL 0 in response to the 10 DET. pulse and since the signal is at LEVEL 0 at the beginning of BCO12 when a 10 DET. pulse occurs the signal is shifted to LEVEL 2. The 11 DET. pulse at the beginning of BCO10 switches the signal back to level 1 and the 10 DET. pulse at the beginning of BCO16 shifts the output signal to LEVEL 2.

During decoding the multivibrator 108' is triggered during bit cell 1 of the output signal (BCO1) and during BCO3, BCO7, BCO14, and BCO16 thereby setting ODR3. The resulting DR2S pulses from the 11 TRANS pulses also set ODR2. The multivibrator 112' is triggered during BCO10 and BCO12 and the resulting DR2S pulses set ODR2. The resulting waveform at the Q output of ODR1 is as shown in FIG. 7 and is identical with the NRZ data previously encoded.

It will be apparent that while the apparatus for carrying out the method of the present invention is disclosed as utilizing predefined level changes for identifying the two bit configurations 00 and 11 in the first embodiment and for identifying the two bit configurations 11 and 10 in the second embodiment, the method is equally applicable to the assignment of predefined level changes as identifying the two bit configurations 01, 10 or 00, 01 with only minor revisions in the apparatus being required. Also, it will be understood by those skilled in the art that the three outputs designated LEVEL 0, LEVEL 1, and LEVEl 2 may be utilized in amplitude, frequency, or phase modulating schemes and that the invention is applicable to a variety of communication systems.

Having thus described my invention what I claim is:

1. A method of encoding binary data comprising the steps of:

1. detecting the bit configuration of adjacent bits in data;
2. upon detection of a first of the four possible two bit configurations producing a level change in an output signal from the existing level to a first level unless the existing level of said output signal is said first level in which event producing a level change from said first level to a third level;
3. upon detection of a second of said four possible two bit configurations, the second bit of which is the complement of the second bit of said first of said four possible two bit configurations, producing a level change in said output signal from the existing level to a second level unless the existing level of said output signal is said second level in which event producing a level change from said second level to said third level;
4. upon detection of either of the other two of said four possible two bit configurations maintaining the level of said output signal at the level existing prior to detection of either of said other two of said four two bit configurations;
5. inhibiting a level change in said output signal for one bit cell time upon detection of either of said first or second of said four possible two bit configuration.

2. Data encoding apparatus for converting an input bit stream wherein the content of the data is represented by one of two voltage levels to an output bit stream wherein the content of the data is represented by transitions between three voltage levels comprising:

data storage means including at least two storage elements;

timing means connected with said storage means and including means for generating a clock signal for shifting said input bit stream into said storage elements, said timing means further including means for generating a sampling pulse train having pulses occurring within the clock interval of said clock signal;

first AND function performing logic means responsive to said sampling pulse train and to the level of the two bits of data stored in said two elements for developing a first control pulse train containing pulses representing the detection of one of the four possible two bit configurations stored in said two elements;

second AND function performing gate means responsive to said sampling pulse train and to the level of the two bits stored in said two storage elements for developing a second control pulse train containing pulses representing the detection of a second of the four possible two bit configurations stored in said two elements;

means for inhibiting a subsequent pulse in said first or second control pulse trains for one clock interval;

voltage level control means responsive to said first control pulse train for switching the level of said output bit stream from a first level to a second level or between said second level and a third level depending upon the level of the output bit stream at the time of receipt of a pulse in said first control pulse train, said voltage level control means further responsive to said second control pulse train for switching the level of said output bit stream between said first and third levels or from said second level to said first level depending on the level of the output bit stream at the time of receipt of a pulse in said second control pulse train.

3. The apparatus defined in claim 2 wherein the pulses contained in said first control pulse train represent the detection of one of the two bit configurations 11 or 00 and the pulses contained in said second control pulse train represent the detection of the other of the two bit configurations 11 or 00.

4. The apparatus defined in claim 3 wherein the said one of the two bit configurations 11 or 00 is 11 and the said other of the two bit configurations 11 or 00 is 00.

5. The apparatus defined in claim 2 wherein the pulses contained in said first control pulse train represent the detection of one of the two bit configurations 01 or 10 and the pulses contained in said second control pulse train represent the detection of the other of two bit configurations 01 or 10.

6. Data encoding apparatus for converting an input bit stream wherein the content of the data is represented by one of two voltage levels to an output bit stream wherein the content of the data is represented by transitions between three voltage levels comprising:

data storage means including at least two storage elements;

timing means connected with said storage means for generating a clock signal for shifting said input bit stream into said storage elements and for generating a sampling pulse train having pulses occurring within the clock interval of said clock signal;

first AND function performing logic means responsive to said sampling pulse train and to the level of the two bits of data stored in said two elements for developing a first control pulse train containing pulses representing the detection of one of the four possible two bit configurations stored in said two elements;

second AND function performing gate means responsive to said sampling pulse train and to the level of the two bits stored in said two storage elements for developing a second control pulse train containing pulses representing the detection of a second of the four possible two bit configurations stored in said two elements;

OR function performing logic means for inhibiting a subsequent pulse in said first or second control pulse trains for one clock interval;

voltage level control means for switching the level of said output bit stream between first, second and third successively higher voltage levels, said voltage level control means responsive to said first control pulse train for switching the level of said output bit stream from said first level to said second level or from said second level to said third level or from said third level to said second level depending upon whether the level of the output bit stream at the time of receipt of a pulse in said first control pulse train is at said first, second or third levels respectively, said voltage level control means further responsive to said second control pulse train for switching the level of said output bit stream from said first level to said third level or from said second level to said first level or from said third level to said first level depending upon whether the level of the output bit stream at the time of receipt of a pulse in said second control pulse train was at said first, second or third levels respectively.

7. Data encoding apparatus for converting an input bit stream wherein the content of the data is represented by one of two voltage levels to an output bit stream wherein the content of the data is represented by transitions between three voltage levels comprising:

data storage means including at least two storage elements;

timing means connected with said storage means for generating a clock signal for shifting said input bit stream into said storage elements and for generating a sampling pulse train having pulses occurring within the clock interval of said clock signal;

first AND function performing locic means responsive to said sampling pulse train and to the level of the two bits of data stored in said two elements for developing a first control pulse train containing pulses representing the detection of one of the four possible two bit configurations stored in said two elements;

second AND function performing gate means responsive to said sampling pulse train and to the level of the two bits stored in said two storage elements for developing a second control pulse train containing pulses representing the detection of a second of the four possible two bit configurations stored in said two elements;

OR function performing logic means for inhibiting a subsequent pulse in said first or second control pulse trains for one clock interval;

voltage level control means for switching the level of said output signal between a low, intermediate, and high voltage level, said voltage level control means establishing said low level in response to a pulse in said first control pulse train unless said output signal is already at said low level in which event said voltage level control means establishes said high level, said voltage level control means establishing said intermediate level in response to a pulse in said second control pulse train unless said output signal is already at said intermediate level in which event said voltage level control means establishes said high level.

8. Apparatus for converting a three level coded signal to a two level bit stream comprising:

level detector means responsive to said coded signal for detecting whether said coded signal is at a first, second or third level;

storage means for storing the previous and present output of said level detector means;

first logic means for developing first output pulses whenever said present output is said second level and said previous output is said first or third levels or said present output is said third level and said previous output is said second level;

second logic means for developing second output pulses whenever said present output is said first level and said previous output is said second or third levels or said present output is said third level and said previous output is said first level;

formulation register means;

means responsive to said first output pulses for formulating in said register means a bit stream comprising the two bit configurations 11 following an alternate 01 bit pattern of length dependent on the elapsed bit time interval since a previous one of said first or second control pulses;

means responsive to said second output pulses for formulating in said register means a bit stream comprising the two bit configuration 00 following an alternate 10 bit pattern of length dependent on the elapsed bit time since a previous one of said first or second control pulses.

9. A method of constructing an NRZ bit stream from a three level coded bit stream wherein certain level changes between two of the three levels represent the two bit configuration 11 and certain other level changes between two of the three levels represent the two bit configuration 00 comprising the steps of:

detecting whether said coded signal is at a first, second or third level and comparing the present level of the coded signal with the previous level of the coded signal to ascertain whether the change in level represents the two bit configuration 11 or the two bit configuration 00;

registering the state of the bits so ascertained while registering an alternate bit pattern therebetween such that the bit of the alternate bit pattern adjacent the second of two successive non-adjacent pairs of like bits is the inverse of said second pair of like bits.

10. Data encoding apparatus having input means for receiving a two level binary data signal and first, second and third output means for generating a coded output, said apparatus further including means responsive to said data signal for detecting discrete pairs of 0's and discrete pairs of 1's in said data signal, means responsive to the detection of a discrete pair of 0's for enabling said first output means to the exclusion of said second and third output means if said first output means is disabled at the time of detection of said discrete pair of 0's and for enabling said third output means to the exclusion of said first and second output means if said first output means is already enabled at the time of detection of said pair of 0's, means responsive to the detection of a discrete pair of 1's for enabling said second output means to the exclusion of said first and third output means if said second output means is disabled at the time of detection of said discrete pair of 1's and for enabling said third output means to the exclusion of said first and second output means if said second output means is already enabled at the time of detection of said discrete pair of 1's.

11. Apparatus for encoding binary data comprising:

clock means for forming a plurality of bit cells of substantially uniform time durations, logic means responsive to the state of adjacent bits of said binary data and to said clock means for providing a three level output signal containing transitions between the separately identifiable states of said output signal at the beginning of a selected one of the two bit cells containing said adjacent bits to identify the state of the two adjacent bits of data, said logic means responding to a first pair of adjacent bits forming one of the four possible two bit configurations by producing a transition from the existing level of said output signal to a first level at the beginning of said selected one of the bit cells unless the existing level of said output signal is said first level in which event said logic means producing a transition from said first level to a third level, said logic means responding to a second pair of adjacent bits forming a second of the four possible two bit configurations, the second bit of which is the complement of the second bit of said first pair of adjacent bits by producing a transition from the existing level of said output signal to a second level unless the existing level of said output signal is at said second level in which event said logic means producing a transition from said second level to said third level whereby each transition between two of said three levels encodes two bits of previously uncoded data.

12. The apparatus defined in claim 11 wherein said selected one of the bit cells containing said adjacent bits is the bit cell containing the first of the two adjacent bits.

13. The apparatus defined in claim 11 wherein said one of the four possible two bit configurations is 11 and said second of the four possible two bit configurations is 00.

14. The apparatus defined in claim 11 wherein said one of the four possible two bit configurations is 11 and wherein said second of the four possible two bit configurations is 10.

15. The apparatus defined in claim 11 wherein said one of the four possible two bit configurations is 01 and wherein said second of the four possible two bit configurations is 10.

16. The apparatus defined in claim 11 wherein said one of the four possible two bit configurations is 00 and wherein said second of the four possible two bit configurations is 01.

17. The apparatus defined in claim 11 further comprising decoder logic means responsive to the present and previous level of said coded output signal for registering a first binary characterization in each bit cell containing a transition between two of said three levels and registering said one or the other binary characterization in the following bit cell depending upon whether the level of said output signal following a transition is at said first or second levels respectively, or if the level following a transition is said third level then registering said one or said other binary characterization in the following cell depending upon whether the level of said output signal just prior to the transition was at said first or second level respectively, said decoder logic means registering said other binary characterization in each of the remaining bit cells.

* * * * *

UNITED STATES PATENT AND TRADEMARK OFFICE
CERTIFICATE OF CORRECTION

PATENT NO. : 3,927,401

DATED : December 16, 1975

INVENTOR(S) : Duane E. McIntosh

It is certified that error appears in the above-identified patent and that said Letters Patent are hereby corrected as shown below:

Column 2, line 14, before "decoding" insert -- of the --.

Signed and Sealed this

*eighth* Day of *June 1976*

[SEAL]

*Attest:*

RUTH C. MASON
*Attesting Officer*

C. MARSHALL DANN
*Commissioner of Patents and Trademarks*